Jan. 2, 1968        A. W. BRANDT        3,361,871
TELEPHONE CABLE CONSTRUCTION
Filed Aug. 19, 1965        4 Sheets-Sheet 1
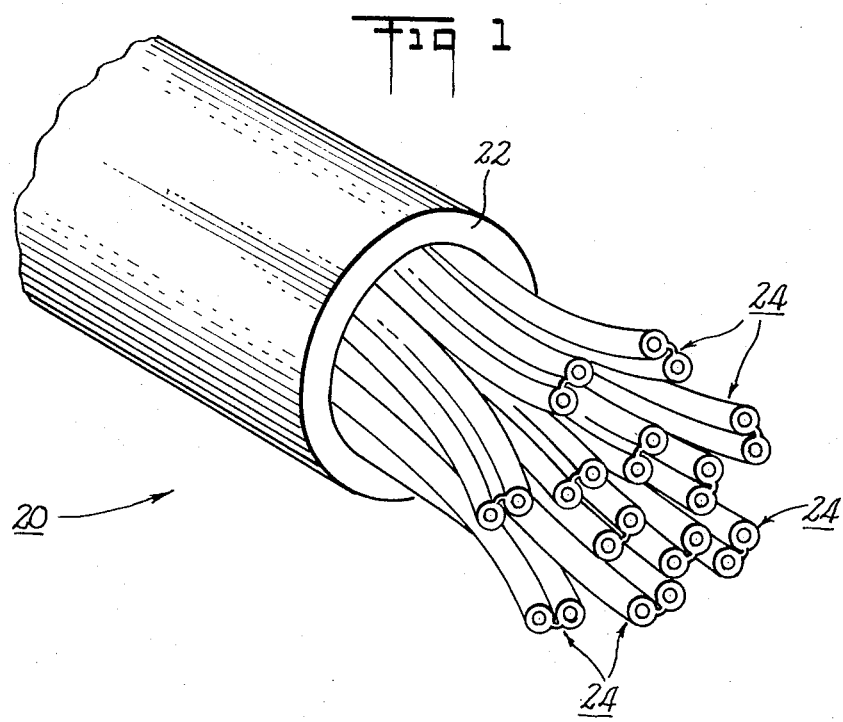
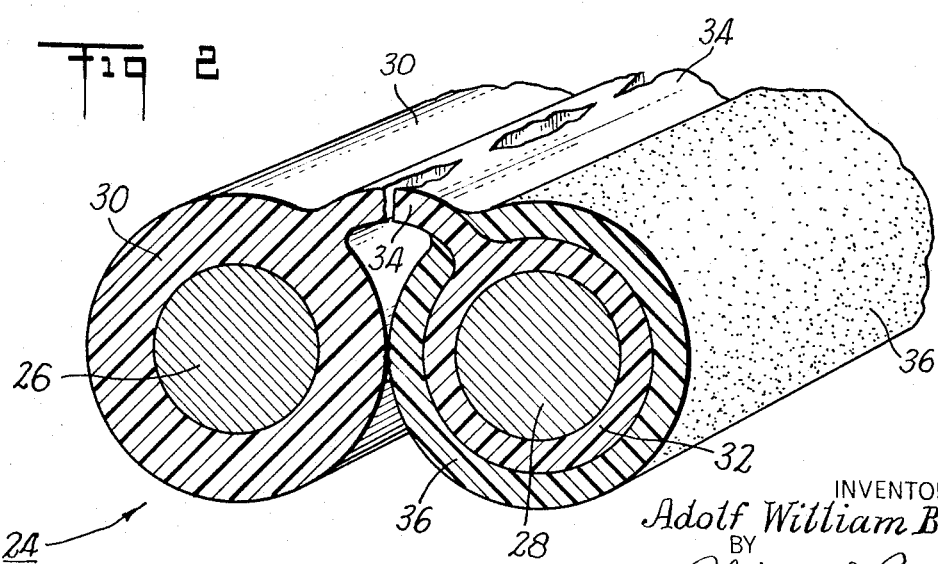
INVENTOR
*Adolf William Brandt*
BY
*Blair and Buckles*
ATTORNEYS

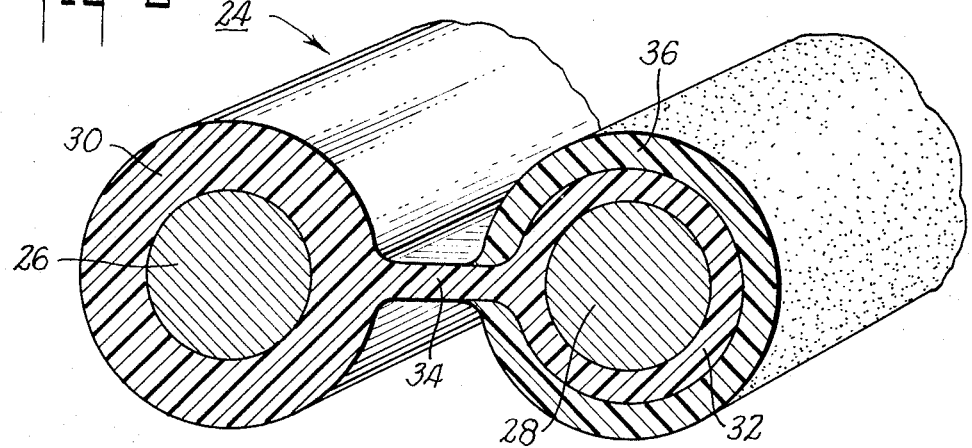
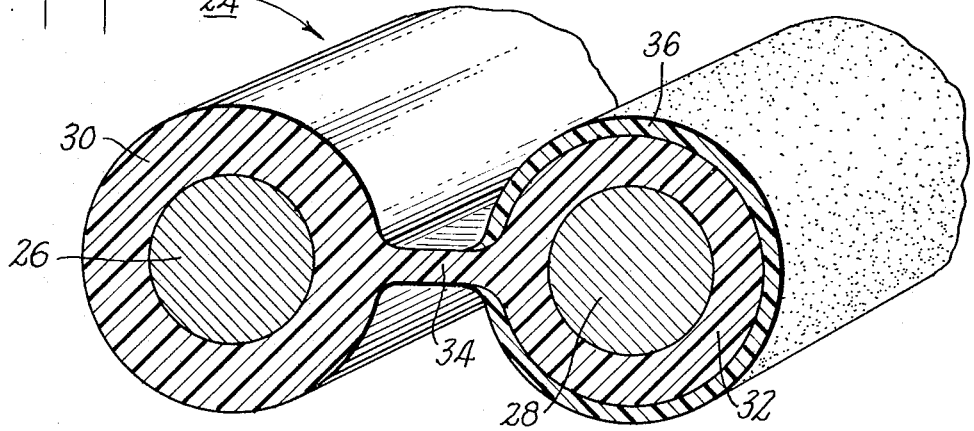
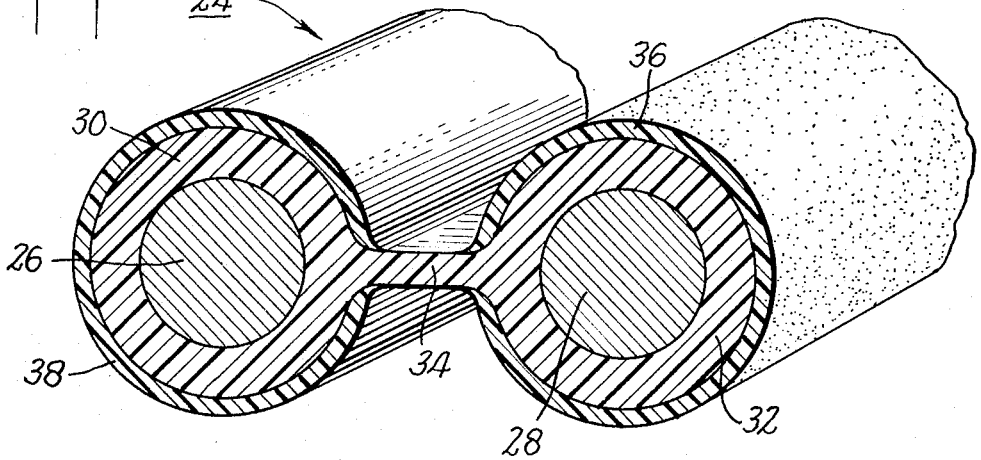

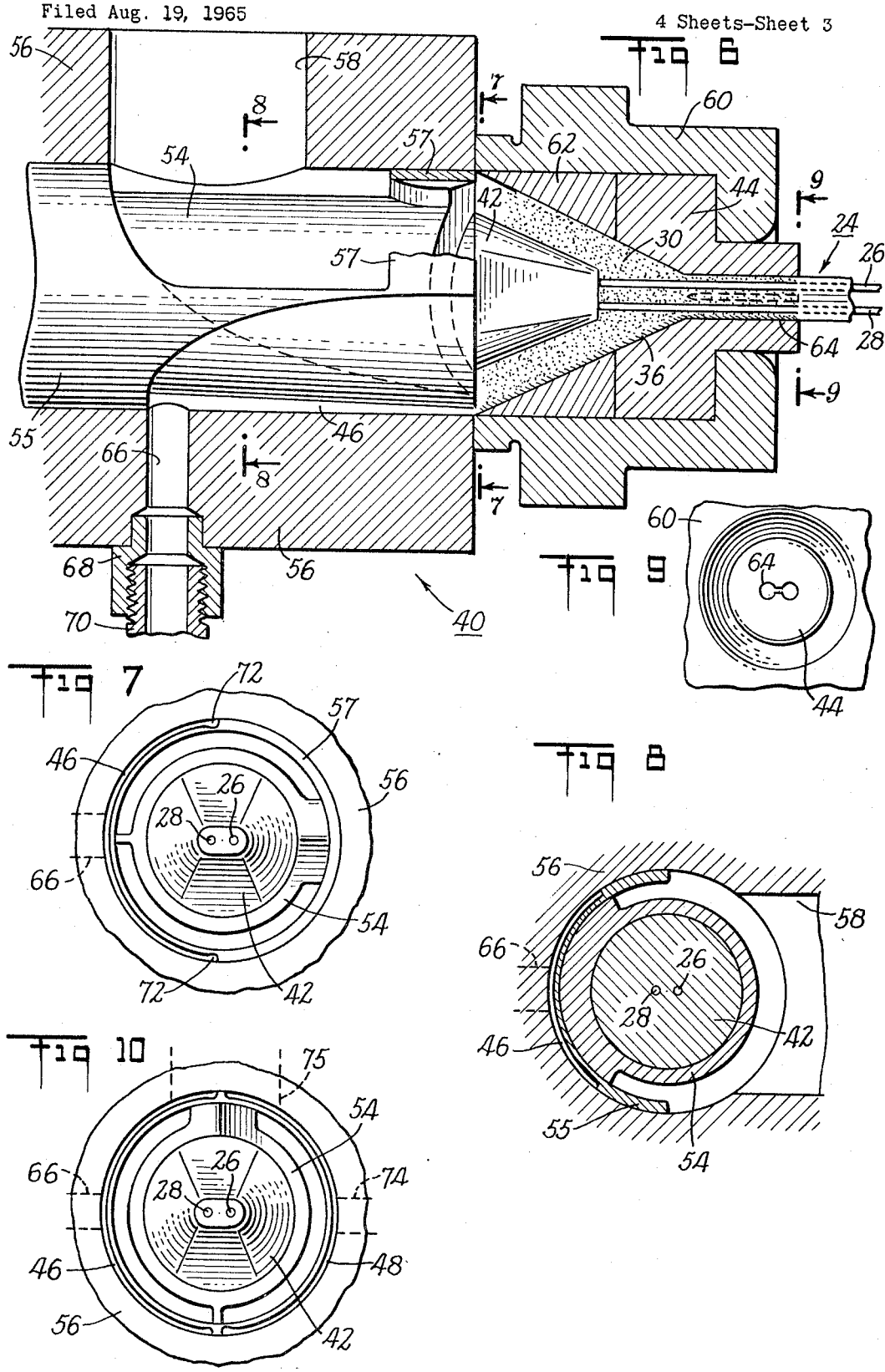

Jan. 2, 1968  A. W. BRANDT  3,361,871
TELEPHONE CABLE CONSTRUCTION
Filed Aug. 19, 1965  4 Sheets-Sheet 4
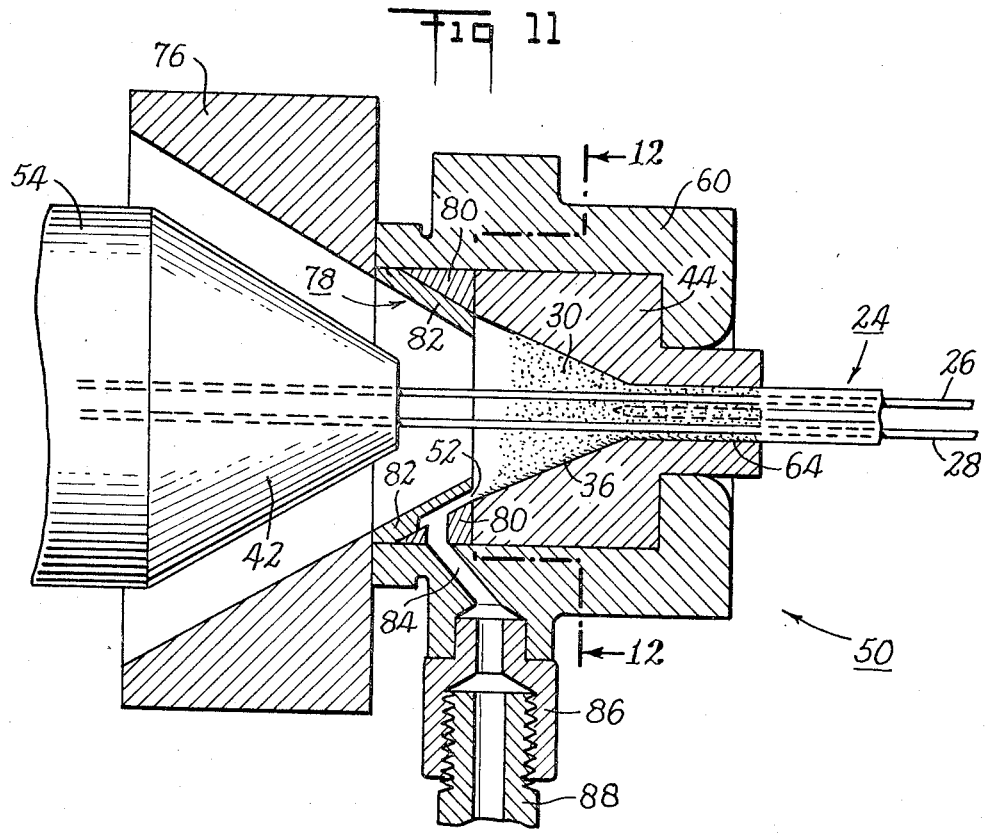
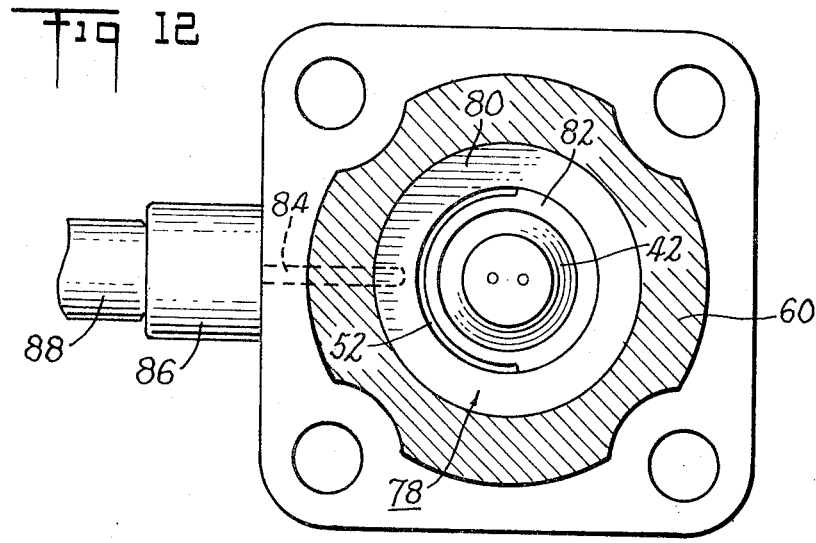

3,361,871
TELEPHONE CABLE CONSTRUCTION
Adolf W. Brandt, Stratford, Conn., assignor to The Whitney Blake Company, New Haven, Conn.
Filed Aug. 19, 1965, Ser. No. 480,963
5 Claims. (Cl. 174—112)

This invention relates to telephone cable constructions. More particularly it relates to telephone cable constructions wherein pairs of wires are joined together by a thin web of insulating material for the purpose of easy pair identification.

From almost the beginning of the art, multi-conductor telephone cables have been insulated with paper, applied as a helical tape or laid down directly on the conductor in the form of pulp. Solid paper has a dielectric constant in the order of 2.5 to 3.0 but in the case of either ribbon or pulp insulation a considerable amount of air is included in the electric field surrounding the conductor so that the composite effective dielectric constant is of quiet low value, usually about 1.5 to 1.6 in a typical design. This lower dielectric constant provides lower capacitance losses in the cable. In recent years, as various plastics and other polymeric materials have become available, these have become competitors of paper. Polyethylene, in particular, now has an important field of application. Polyethylene is attractive because of its excellent electrical properties including low dielectric constant and power factor, compared with other usable plastics, and high dielectric strength. It is also highly impermeable to water or water vapor and is available in the desired quantities at a reasonable price. Additionally, the long term price trend is downward.

Polyethylene insulation is applied to the wire by an extrusion process. Generally the polyethylene is supplied as granules previously compounded with an antioxidant. The granules, in which a pigment has been incorporated, are fed into the extruder and formed on the conductor as a uniform close fitting tube of insulation.

Polyethylene has a dielectric constant at 1,000 cycles per second of approximately 2.3. Thus, the capacitance losses of polyethylene telephone cables are greater than those of ribbon or pulp insulated cables. Furthermore, the pigments necessary to color code the wire increase the effective dielectric constant.

Other methods of the prior art for decreasing the effective dielectric constant have been to use expanded polyethylene (i.e. an air impregnated spongy insulation) or to extrude the insulation on the wires with air entrapping grooves. To date for conventional multipair cable use, neither of these forms have enjoyed any appreciable commercial success.

The individual pairs in a telephone cable are twisted. During the twisting operation, one wire may twist more than the other wire. Thus, one wire in the finished cable will be longer than the other. The nonuniform twist causes capacitance unbalance between the pairs in the cable, and the difference in length of the wires of an individual pair causes both resistance unbalance and pairs to ground capacitance unbalance. Both resistance unbalance and capacitance unbalance are undesirable in telephone cable constructions.

The resistance and capacitance unbalance of plastic insulated cables can be considerably reduced by joining the pairs together by means of a web as disclosed in Brazee Patent No. 3,105,108, issued Sept. 24, 1963, and in the patent of J. B. Cook et al., No. 3,102,160, issued Aug. 27, 1963, both assigned to the assignee of the present application. However, the assignor of the present application was unable to make any appreciable quantities of color coded webbed pair cable using the apparatus of the prior art disclosed in British Patent No. 950,741. It was found that the coat layer of insulation could not be kept uniform either in thickness or in its angular extent about one of the webbed pairs.

In the apparatus disclosed in the above-identified British patent, the coat layer is introduced into the die of the extruder. The pressure of the coat layer causes the nearest wire to be pushed off center during the extrusion process. I have found that this effect can be eliminated by introducing the coat layer upstream of the die so that the base layer and coat layers reach equilibrium pressure before entering the die. Preferably the coat layer is introduced into the die cup upstream of the end of the core tube supporting the wires as they enter the chamber.

I believe that some of the nonuniformities of the product produced by the apparatus disclosed in the above-identified British patent are the result of turbulent flow of the coat layer due to its being introduced at right angles to the flow of the base layer. I, therefore, prefer to introduce the coat layer into the die cup in the direction of flow of the base layer. I also prefer to use a nozzle having a slowly expanding and guiding shape fanning the coat layer to a stream of tubular or partially tubular form surrounding the base coat material before it enters the die cup. My novel coat layer nozzle may be used to extrude a coat layer on a rigid wire as well as in manufacturing the unified pair product of the invention.

It is, therefore, an object of the present invention to provide telephone cable constructions employing plastic insulation.

Another object of the invention is to provide telephone cable constructions employing polyethylene insulation.

Still another object of the invention is to provide telephone cable constructions of the above character providing easy pair and individual conductor identification.

Yet another object of the invention is to provide telephone cable constructions of the above character providing low resistance unbalance in each pair of wires.

A further object of the invention is to provide telephone cable constructions of the above character providing more uniform pair twists.

Yet a further object of the invention is to provide telephone cable constructions of the above character providing superior dielectric strength.

Another object of the invention is to provide telephone cable constructions of the above character utilizing less conductor material than heretofore required to provide equivalent electrical characteristics.

A further object of the invention is to provide telephone cable constructions of the above character of smaller gages than heretofore practical.

Still another object of the invention is to provide telephone cable constructions of the above character having increased pair strength.

Another object of the invention is to provide telephone cable constructions of the above character having a low effective dielectric constant in each pair of wires.

Other objects of the invention will in part be obvious and will in part appear hereinafter.

The invention accordingly comprises an article of manufacture possessing the features, properties and the relation of elements which will be exemplified in the articles hereinafter described; and apparatus for manufacturing the articles comprising the features of construction, combinations of elements and arrangements of parts which will be exemplified in the constructions hereinafter set forth. The scope of the invention will be indicated in the claims.

For a fuller understanding of the nature and objects of the invention reference should be had to the following detailed description taken in connection with the accompanying drawings in which:

FIGURE 1 is a perspective view of a telephone cable constructed according to a preferred embodiment of the invention;

FIGURE 2 is an enlarged perspective view, partially in cross section, of a pair of wires of the cable of FIGURE 1;

FIGURE 3 is a perspective view, similar to FIGURE 2, of a pair of wires of the cable of FIGURE 1 as they leave the extruder die;

FIGURE 4 is a perspective view, similar to FIGURE 3, of a modified pair of wires according to the invention;

FIGURE 5 is a perspective view, similar to FIGURE 3, of another modified pair of wires according to the invention;

FIGURE 6 is a cross sectional view of extruding apparatus used in making the wire pair of the invention;

FIGURE 7 is a cross sectional view taken along the line 7—7 of FIGURE 6;

FIGURE 8 is a cross sectional view taken along the line 8—8 of FIGURE 6;

FIGURE 9 is an end view taken along the line 9—9 of FIGURE 6;

FIGURE 10 is a cross sectional view similar to FIGURE 7 of an alternative form of extruding apparatus;

FIGURE 11 is an enlarged cross sectional view similar to FIGURE 6 of an alternative extruding apparatus; and, FIGURE 12 is a cross sectional view taken along the line 12—12 of FIGURE 11.

The same reference characters refer to the same parts throughout the several views of the drawings.

Now referring to FIGURE 1, the telephone cable 20 of the present invention generally comprises a conventional outer layer or layers of insulation 22 surrounding a plurality of pairs of wires 24, with or without an intermediate shield.

A pair of wires 24 is shown in an enlarged view in FIGURE 2. Each pair of wires 24 comprises conductor wires 26 and 28. A base coat 30 of plastic insulation surrounds wire 26. Wire 28 is also surrounded by a base coat 32 of the same plastic material, but of thinner cross section. A wib 34 is integrally formed with the base coat 30 and 32 to join the two wires 26 and 28 into a unified pair 24. The web is preferably very thin allowing the wires to take the shape shown in FIGURE 2 under their own weight as they leave the extruder that applies the insulation. An outer coat layer 36 is preferably applied to surround base coat 32 about wire 28.

For color coding, the base 30 is preferably of one color and the outer coat 36 of another.

The pair of wires 24 is shown as it leaves the insulation extruder in FIGURE 3. The coat 36 may be made quite thin as shown in FIGURE 4.

It will be noted by those skilled in the art that web 34 by extending beyond the insulating layers 30 and 36 resists compacting of the twisted pairs 24 in the cable 20. Air is therefore substituted for plastic as some of the dielectric insulation in the cable. Thus, a given mutual capacitance can be achieved with somewhat thinner insulating layers 30, 32 and 36 than with conventional individually insulated and twisted conductors.

An alternative embodiment of the invention providing minimum effective dielectric constant for the insulation is shown in FIGURE 5. The base layer 30 is transparent, the coat layer 36 about wire 28 is thin and of colored plastic material and a second coat layer 38 is applied on the base layer 30 about wire 26. The second coat layer 38 is colored a different color from coat layer 36 for color coding purposes.

The preferred form of extruding apparatus is shown at 40 in FIGURE 6.

It comprises a core tube 42 supporting the pair of wires 26 and 28, as they pass through a die 44 extruding the insulation about the wires. The base layer of insulation 30 is fed to the extruder 40 about the core tube 42. The coat layer 36 is fed from an arcuate nozzle 46, see also FIGURE 7, located upstream of the core tube 42. In this position the coat layer 36 reaches equilibrium pressure with the base layer 30 before entering the die 44 and thus uniformly coats wire 28 without disturbing the centering of wire 28 within the die 44. This is in contradistinction to the apparatus of the prior art as illustrated in British Patent No. 950,741 wherein the coat layer is introduced at the die 44. We have found that uniform coat layers cannot be applied in this manner as the pressure of the coat layer being introduced into the die decenters the wires as they pass through the die.

Although the extruding apparatus shown in FIGURE 6 is preferred, wherein the nozzle 46 is located upstream of the core tube 42, an acceptable product may be manufactured on the extruding apparatus 50 illustrated in FIGURE 11. In this apparatus a nozzle 52 supplies the base coat between the core tube 42 and the die 44. However, the product produced by this apparatus will not display the uniformity of products produced by the extruding apparatus 40 of FIGURE 6. Furthermore, if it is desired to coat both wires, the extruder 50 of FIGURE 11 cannot be used as the nozzle 52 in order to coat one wire must extend through an arc greater than 180° as shown in FIGURE 12. In the extruding apparatus 40 shown in FIGURE 6, the second nozzle 48 may be easily incorporated in the apparatus, as shown in FIGURE 10.

More specifically, referring to FIGURE 1, when the cable 20 is used for transmission over long distances or when a high dielectric strength is desired, the outer insulation 22 is preferably formed of polyethylene. For cables used in relatively short lengths, this may be less expensive polyvinylchloride.

Now referring to FIGURE 2, in prior art telephone cables, it has been found that serious difficulties are encountered in producing practical cables if the diameters of the wires 26 and 28 are less than No. 24 wire; that is, have a diameter of .02010 inch. When smaller wires are used, the wires may draw nonuniformly as the insulation is being applied and furthermore may twist nonuniformly when the pairs are being twisted together causing undesirable resistance and capacitance unbalance. We have found, however, that the construction illustrated in the present application may be manufactured on extruding apparatus using a No. 26 wire to meet essentially the same resistance and capacitance unbalance specifications. No. 26 wire has a diameter of .01594 inch. This results in a substantial saving in the amount of copper, the preferable conductor material on installations having low loop resistance. Furthermore, the overall diameter of the cable can then be reduced.

It should be noted that the web 34 is preferably made very thin so that it often perforates, as shown in FIGURE 2. It should not be made so thin, however, that it allows the wires to separate in the cable. The web preferably has a thickness of .005 inch when high density polyethylene is used as the insulating material, which is preferred.

Now referring to FIGURE 3, in a No. 22 size pair the wires 26 and 28 have a diameter of .0253 and are formed of bare soft copper. The outer diameter of the base layer 30 about wire 26 and the outer coat layer 36 about the wire 28 is .045 inch. The center to center distance between the wires 26 and 28 is preferably .060 inch for the standard .083 microfarad per mile exchange area cable and the web 34, as previously stated, has a thickness of .005 inch. While it is easier to make the coat layer 36 thick, as shown in FIGURES 2 and 3, it can be made very thin, as shown in FIGURE 4, and this is preferred.

In an alternative embodiment of the invention (the pair 24 shown in FIGURE 5) the base coat 30 is of clear transparent polyethylene and the separate coatings 36 and 38, also of polyethylene, are of different colors. This embodiment provides a lower effective dielectric constant since the dielectric constant of clear polyethylene is lower than that of colored polyethylene. This is generally true of all plastic insulation materials. Furthermore, the double coated wires have better dielectric quantities than single coated wires.

As will be obvious to those skilled in the art, the cable construction illustrated in FIGURES 1 through 5 greatly facilitates splicing, in that each pair of wires 24 may be separated from the rest of the cable easily. In prior cables this was not always the case. If the splicer were looking for a red and blue pair, for example, he would find many individual red and blue wires in a cable and would have to strip back the outer insulation far enough to make certain that the red and blue wires he was looking at were twisted together to form an individual pair and were not wires from differing pairs. In the cable construction of the present invention, once the pair has been located by the color code it can be conveniently pulled away from the other pairs and the individually insulated conductors separated for the application of splicing terminals.

Now referring to FIGURES 6, 7, 8 and 9, the pairs 24 illustrated in FIGURES 1, 2, 3 and 4 have the insulation extruded thereon in the extruding apparatus 40. The core tube 42 of the extruding apparatus 40 is supported in a core tube holder 54. The core tube holder 54 is held in the head assembly 56. A hole 58 in the head assembly communicates with a screw extruder that forces the base material into the head assembly 56 about the core tube holder 54. Die holder 60 is mounted to the head assembly 56 in a conventional manner. Die 44 is similarly conventionally mounted in die holder 60, as is wedge ring 62. The wedge ring 62 and die 44 form a cone shaped die cup leading to the die opening 64 shown in FIGURE 9. the die opening 64 is shaped in the form of the outer surface of the webbed pair 24.

In the example of No. 22 wire previously given, the circular portions of opening 64 have a diameter of .046, their centers are separated by .070 inch and the weblike opening therebetween is .006 inch wide. Note that the opening 64 is slightly larger than the resulting size of the outer surface of the insulation on the pair 24 due to shrinkage of the high density polyethylene following extrusion.

Core tube holder 54 has formed therein a semi-cylindrical sleeve portion 55 (FIGURES 6 and 8) which is cut away, as seen in FIGURES 6, 7 and 8, to form nozzle 46.

A bore 66 in the head assembly 56 communicates with the nozzle 46. A fitting 68 and an adaptor 70 connect the bore 66 to a second screw extruder for extruding the coat layer insulation 36 through the nozzle 46.

The cross sectional area of nozzle 46 decreases throughout its extent by about one-half in order to maintain pressure in the coat layer 36 as it is extruded therethrough. Thus, the coat layer slowly fans out from bore 66 until it forms a half cylinder surrounding the core tube 42. It then enters the cone shaped die cup formed by the walls of wedge ring 62 and die 44 where it tapers down to surround wire 28. The core tube holder 54 is further modified by a semi-cylindrical portion 57, FIGURES 6 and 7, which aids in supporting the ends 72 of the nozzle 46.

The nozzle 46, as seen in FIGURE 7, completes very nearly a 180° arc and the ends 72 thereof are slightly larger in cross section than the mid portions thereof. The mid portions of the nozzle opening may be approximately .010 to .040 inch in width depending on the thickness desired for the coat layer 36.

The coat layer 36 tends to arcuately spread out as it passes through the wedge ring 62 and die 44 and the coat fully covers conductor 28 as it leaves the die 44, as shown in FIGURES 1 through 5.

As previously stated, when separate coats 36 and 38 are to be applied to the wires 28 and 26 respectively, a second nozzle 48 is provided, as shown in FIGURE 10. A second bore 74 in the head assembly 56 communicates with a third screw extruder for extruding the second coat layer 38. In this embodiment sleeve portion 55 of the core tube holder 54 forms a complete cylinder and is cut away on opposite sides to form nozzles 46 and 48. The base coat is supplied through bore 75 at right angles to bores 66 and 74. Nozzle 48 is shaped in the same manner as nozzle 46.

Now referring to FIGURE 11, in an alternative embodiment usable when a single arcuate layer 36 is to be extruded, core tube 42 and core tube holder 54 are mounted in head assembly 76. Die holder 60 is mounted to head assembly 76. Die 44 is mounted in die holder 60. However, the wedge ring 78 is modified to provide an arcuate nozzle 52 therein. Thus, wedge ring 78 comprises two interfitting conically surfaced pieces 80 and 82 forming a conical channel therein to form nozzle 52. Nozzle 52 communicates through a bore 84 in die holder 60 and through a fitting 86 and on adapter 88 connected to a screw extruder for forcing coat layer 36 into the opening in the head assembly. The base coat 30 is supplied about the core tube holder 54. As shown in FIGURE 12 nozzle 52, in order to fully surround the wire 28 with coat layer 36, extends through an arc of slightly more than 180°.

It will thus be seen that the objects set forth above, among those made apparent from the preceding description, are efficiently attained and, since certain changes may be made in the above articles and in the above constructions without departing from the scope of the invention it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A wire pair having low effective dielectric constant and which facilitates conductor identification in communication cable constructions comprising:
 (A) a pair of electrical conductors;
 (B) a base layer of electrical insulating material of relatively low dielectric constant surrounding each said conductor;
 (C) a web of the material of said base layer
  (a) spaced away from the closest adjacent portions of said conductors, and
  (b) serving to hold said conductors together; and
 (D) a coat layer of electrical insulating material of a higher dielectric constant surrounding at least one of said conductors and the base layer of electrical insulating material thereon,
  (a) said coat layer having a different appearance than said base layer.

2. A wire pair as defined in claim 1 wherein said coat layer surrounding one of said conductors is different in appearance from the coat layer surrounding the other of said conductors.

3. A wire pair as defined in claim 1 wherein said coat layer is relatively thin in comparison to said base layer.

4. The wire pair defined in claim 1 wherein said base layer consists essentially of a pure polymer plastic material and said coat layer consists essentially of a pure polymer plastic material and a coloring agent providing a visual difference from said base layer.

5. A communication cable comprising a plurality of wire pairs, each wire pair comprising:
 (A) a pair of electrical conductors;
 (B) a base layer of electrical insulating material of relatively low dielectric constant surrounding each said conductor;
 (C) a web of the material of said base layer
  (a) spaced away from the closest adjacent portions of said conductors, and (b) serving to hold said conductors together; and
(D) a coat layer of electrical insulating material of a higher dielectric constant surrounding at least one of said conductors and the base layer of electrical insulating material thereon,
   (a) said coat layer having a different appearance than said base layer.

References Cited

UNITED STATES PATENTS

| | | | |
|---|---|---|---|
| 2,916,055 | 12/1959 | Brumbach | 174—112 X |
| 3,102,160 | 9/1963 | Cook | 174—112 X |

LEWIS H. MYERS, *Primary Examiner.*

E. GOLDBERG, *Assistant Examiner.*

UNITED STATES PATENT OFFICE
CERTIFICATE OF CORRECTION

Patent No. 3,361,871                      January 2, 1968

Adolf W. Brandt

It is certified that error appears in the above identified patent and that said Letters Patent are hereby corrected as shown below:

Column 1, line 21, "quiet" should read -- quite --.
Column 5, line 4, "quantities" should read -- qualities --.

Signed and sealed this 14th day of October 1969.

(SEAL)
Attest:

Edward M. Fletcher, Jr.
Attesting Officer

WILLIAM E. SCHUYLER, JR.
Commissioner of Patents